(12) United States Patent
Cooper et al.

(10) Patent No.: US 7,594,952 B2
(45) Date of Patent: Sep. 29, 2009

(54) TREATMENT OF SMELTING BY-PRODUCTS

(75) Inventors: Bernard John Cooper, St. Kilda (AU); Kevin Michael Cooper, Newcastle (AU); Brendan Gerard Cooper, Tullamarine (AU); John Joseph Cooper, Bacchus Marsh (AU)

(73) Assignee: Regain Technologies Pty Ltd, Melbourne (AU)

( * ) Notice: Subject to any disclaimer, the term of this patent is extended or adjusted under 35 U.S.C. 154(b) by 384 days.

(21) Appl. No.: 10/531,835

(22) PCT Filed: Oct. 20, 2003

(86) PCT No.: PCT/AU03/01390

§ 371 (c)(1), (2), (4) Date: Oct. 12, 2005

(87) PCT Pub. No.: WO2004/035238

PCT Pub. Date: Apr. 29, 2004

(65) Prior Publication Data

US 2006/0053973 A1  Mar. 16, 2006

(30) Foreign Application Priority Data

Oct. 18, 2002 (AU) ............................ 2002952159

(51) Int. Cl.
*C22B 1/16* (2006.01)

(52) U.S. Cl. ........................................ 75/751; 423/484
(58) Field of Classification Search ................. 423/483, 423/484; 75/751
See application file for complete search history.

(56) References Cited

U.S. PATENT DOCUMENTS 4,355,017 A * 10/1982 Gamson et al. ............. 423/484
4,444,740 A *  4/1984 Snodgrass et al. ........... 423/483

FOREIGN PATENT DOCUMENTS

| GB | 2198722 A | 6/1988 |
|----|-----------|--------|
| WO | WO 92/12268 A1 | 7/1992 |
| WO | WO 92/20469 | 11/1992 |

* cited by examiner

*Primary Examiner*—Roy King
*Assistant Examiner*—Weiping Zhu
(74) *Attorney, Agent, or Firm*—McGarry Bair PC

(57) ABSTRACT

A method of treating a spent potliner after use in an aluminum smelting process, the method comprising crushing and classifying the spent potliner, placing the classified and crushed spent potliner in a furnace at a temperature greater than 450° C., heating the spent potliner to a temperature greater than 450° C., mixing the heated spent potliner with water to produce reaction gases and residue, burning the reaction gases, mixing the residue with water in a well ventilated area for a period of weeks to cure the residue. The method also embraces blending the cured residue with other chemicals and minerals to provide specific mineral products.

7 Claims, 2 Drawing Sheets

Process Plant Schematic

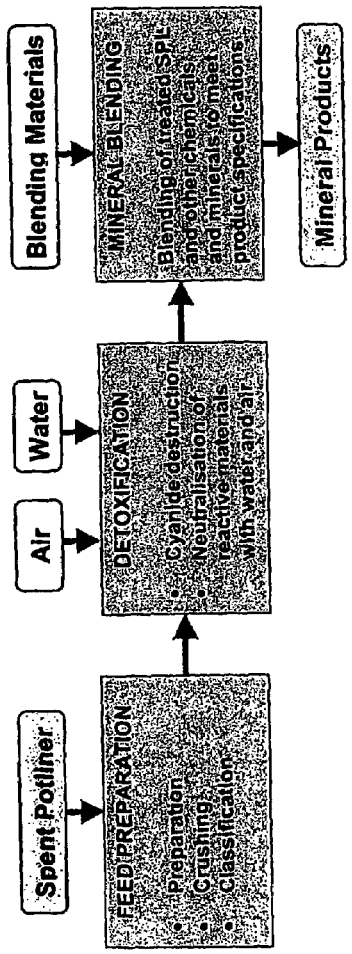
Figure 1 – SPL to Mineral Product Process
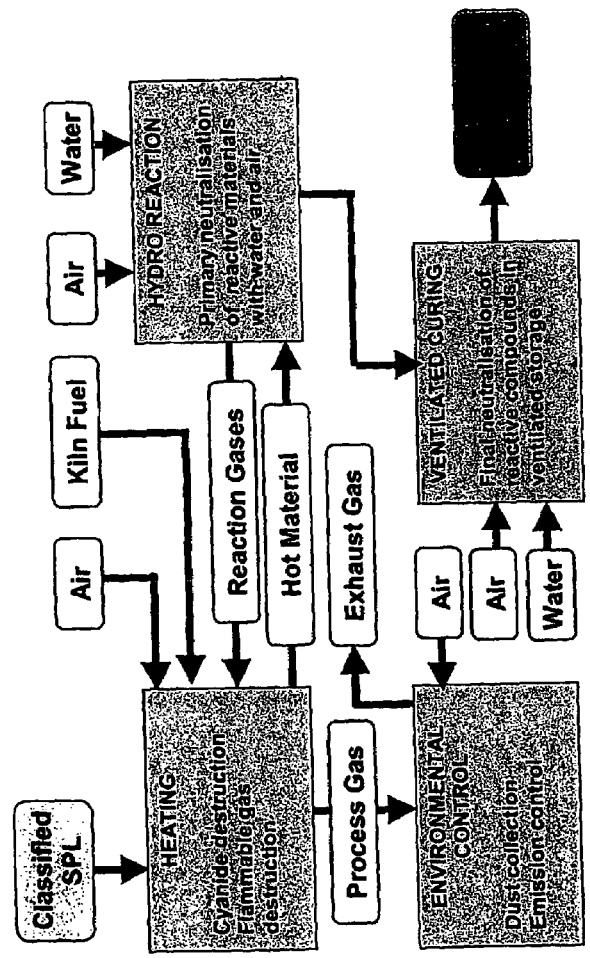
Figure 2 – Detoxification Process Flow Summary

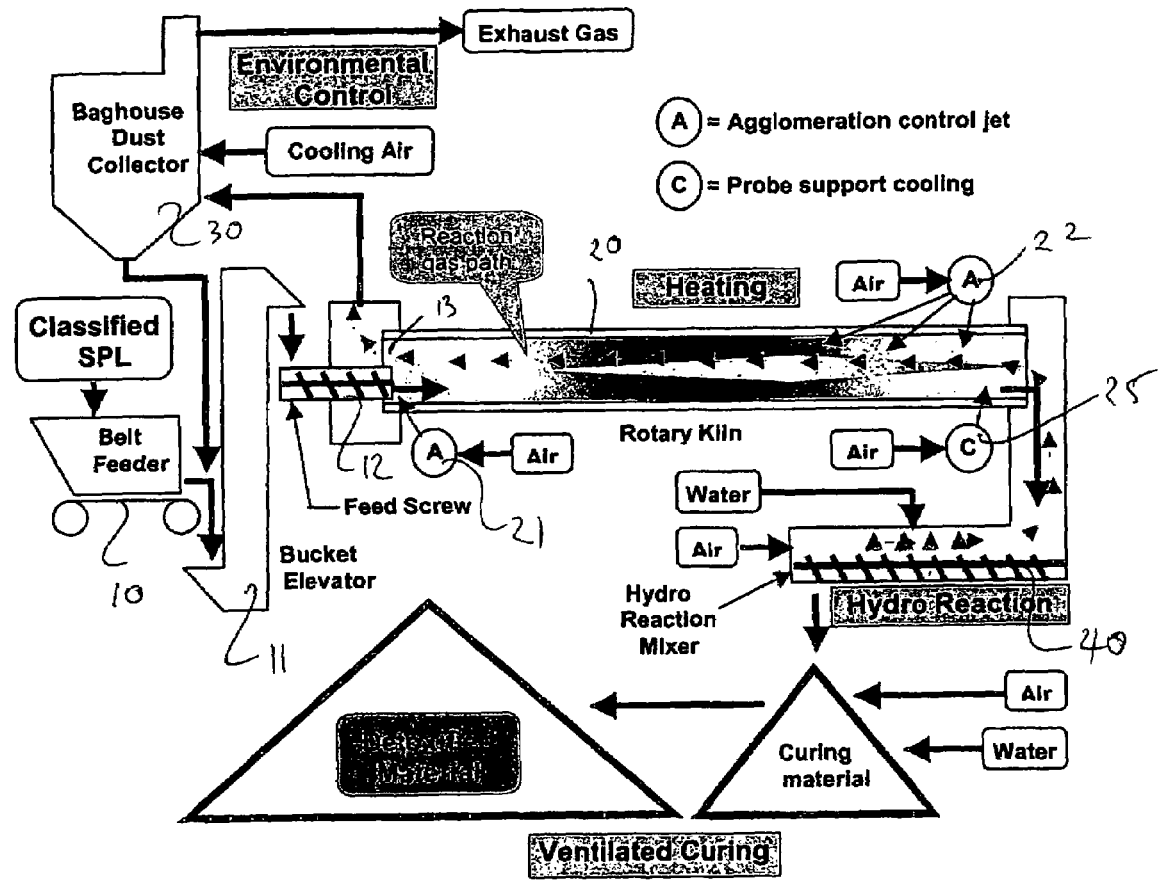
Figure 3 – Process Plant Schematic

TREATMENT OF SMELTING BY-PRODUCTS

CROSS-REFERENCE TO RELATED APPLICATIONS

This application claims priority on International Application No. PCT/AU2003/001390, filed Oct. 20, 2003.

INTRODUCTION

This invention relates to a method and apparatus of treating smelting by-products and in particular by-products of the aluminium smelting process.

BACKGROUND OF THE INVENTION

Production of aluminium metal typically involves the electrolytic reduction of alumina in cells or pots. The electrolyte is made up of molten cryolite and other additives. The electrolyte is contained in a carbon and refractory lining in a steel potshell. The electrolytic cell includes a carbon anode with the lining of carbon coated in refractory material constituting the cathode. Over time the effectiveness of the lining deteriorates and the lining of the pot is removed and then replaced with a new lining. The lining material that has been removed from the pot is referred to a spent potliner (SPL).

The nature of the aluminium reduction cell process results in the formation of various carbides and nitrides within the reduction cell contents (eg refractory lining and carbon cathode and anode).

As an example, at dull red heat and above, many metals such as calcium, aluminium and silicon readily form nitrides.

e.g. $2Al + N_2 \rightarrow Al_2N_2$

At elevated temperatures, such metal oxides also react with carbon to form carbides.

$2Al_2O_3 + 9C \rightarrow Al_4C_3 + 6CO$ $CaO + 3C \rightarrow CaC_2 + CO$

Under these conditions various carbon-nitrogen compounds are also produced in the forms of cyanides, both simple and complex forms.

The spent pot lining materials are also high in soda, and exhibit a pH in the vicinity of 11. This caustic soda is hygroscopic, and absorbs atmospheric water (humidity) which renders it mobile and so able to react with other components of the SPL stockpiles.

SPL is hazardous because of—
  Health and environmental hazards due to the presence of cyanide formed as a result of the reaction of nitrogen from air with the carbon lining.
  Reactive components that combine with water to give of ammonia, methane and hydrogen which presents a potential explosion hazard.

Disposal of SPL has been a problem for many years. In the past it was used as landfill but is now viewed as not environmentally friendly and thus its use as landfill has been banned in many countries. Consequently there have been many proposals to treat and handle SPL. Most of these proposals create some residual waste which can be used as landfill.

This invention comes about from the appreciation that SPL is potentially valuable because of the calorific value of the carbon that it contains and the presence of minerals such as alumina, fluorides, silica and sodium that can be used in other industries.

It is these issues that have brought about the present invention.

SUMMARY OF INVENTION

In accordance with a first aspect of the present invention there is provided a method of treating a spent potliner after use in an aluminium smelting process, the method comprising crushing and classifying the spent potliner, placing the classified and crushed spent potliner in a furnace at a temperature greater than 450° C., mixing the hot spent potliner with water to produce reaction gases, burning the reaction gases, mixing the residue with water and exposing the wet mixture to air for a period of weeks to cure the residue. The method may further comprise blending the cured residue with other chemicals and minerals to provide mineral products of desired characteristics.

Preferably the classified spent potliner is positioned in a rotary kiln into which air is introduced to ensure an oxygen enriched environment.

Preferably thermocouples are used to control the temperature of the kiln. In a preferred embodiment control jets of air are directed into the kiln to prevent agglomeration.

In accordance with a further aspect of the present invention there is provided a plant for processing spend potliners after use in the aluminium smelting process using the method described above.

DESCRIPTION OF THE DRAWINGS

FIG. 1 is a block diagram that illustrates the flow chart to treat spent potliner, FIG. 2 is a detailed flow chart of a detoxification process that forms part of the process illustrated in FIG. 1, and FIG. 3 is a schematic view of the process plant.

DESCRIPTION OF THE PREFERRED EMBODIMENT

An outline of the process for treating a spent potliner (SPL) of an aluminium smelter and producing a mineral product is shown in FIG. 1 in three main steps, namely, (1) feed preparation in which the spent potliner is prepared crushed and classified, (2) detoxification in which the material is heated in the presence of air to destroy the presence of cyanide and mixed with water to cause neutralisation of reactive materials, and (3) a blending step in which treated SPL is mixed with other materials to produce mineral products of particular specifications which can be reused.

The feed preparation step involves recovery of the SPL material either from a storage depot or directly from the smelter pots, primary segregation of aluminium metal, carbon material and refractory materials and crushing size classification and secondary segregation of the materials into like categories. The crushing and classification steps are conventional to those skilled in this art.

Initially classified SPL is fed to the process plant. The sizing of the feed material can vary but typically falls in the range 50 microns to 20 mm.

The detoxification step involves a destruction of most of the cyanide through heat and then neutralisation of the reactive compounds using water. The blending step producing mineral products takes place by blending the detoxified materials with other minerals and chemicals to achieve the desired product specification.

The detoxification process that is shown in detail in the flow summary of FIG. 2 eliminates or substantially reduces the health environmental and explosive hazards that would otherwise be present in SPL. The process involves a destruction of cyanide and the neutralisation of reactive compounds that give off acetylene, ammonia, methane, hydrogen and other gases. In the process described below it is understood that many of the requirements such as the heating temperatures and retention times would vary with different types of SPL material.

The purpose of detoxofication is:

i) to convert as much as possible of the metal and metal compounds to inert oxides—eg.

$$4Al+3O_2 \rightarrow 2Al_2O_3$$

$$Al_4C_3+6O_2 \rightarrow 2Al_2O_3+3CO_2$$

$$4Na_4Fe(CN)_6+35O_2 \rightarrow 8Na_2O_2+2Fe_2O_3+24CO_2+12N_2$$

ii) destroy cyanides and combustible gases—eg.
Cyanide to Carbon Dioxide & Nitrogen $$C_2N_2+2O_2 \rightarrow 2CO_2+N_2$$

Methane to Carbon Dioxide and Water $$CH_4+2O_2 \rightarrow CO_2+2H_2O$$

Ammonia to Nitrogen and Water $$4NH_3+3O_2 \rightarrow 2N_2+6H_2O$$

Hydrogen to Water $$2H_2+O_2 \rightarrow 2H_2O$$

The degree to which aluminium metal is oxidised depends upon the particle size, as a protective coating of the oxide inhibits instantaneous oxidation.

The neutralisation process involves the aqueous quenching of the hot product from the kiln to accelerate the reaction of any remaining metallic aluminium with its caustic environment. This part of the process also sees the reaction of any unoxidised carbides and nitrides as well as (protective) aluminium oxide. Eg.

$$2Al+2OH^-+2H_2O \rightarrow 2AlO_2^-+3H_2$$

$$Al_4C_3+12H_2O \rightarrow 4Al(OH)_3+3CH_4$$

$$CaC_2+2H_2O \rightarrow Ca(OH)_2+C_2H_2$$

$$2AlN+6H_2O \rightarrow 2Al(OH)_3+2NH_3$$

$$Al(OH)_3+OH^- \rightarrow AlO_2^-+2H_2O$$

Gas evolution testing is carried out on the curing product to verify completion of explosive gas generation.

The potentially dangerous cyanide is destroyed by heating the SPL material in the presence of oxygen preferably to a range of between 750° C. to 800° C. The heated SPL is held at that temperature for about 40 minutes. It is however important that the classified SPL is not over heated to a temperature at which fluorides in the material enter the gaseous phase. This typically occurs at temperatures about 850° C. and above.

A typical process plant is schematically shown in FIG. 3. The classified SPL is initially fed to a belt feeder 10 which in turn feeds a bucket elevator 11 that transfers the SPL to a feed screw 12 that communicates with the inlet 13 of an elongate rotary kiln 20. A bag house dust collector 30 is in communication with the belt feeder and bucket elevator to control dust. The bag house dust collector would also include a source of cooling air 33. Agglomeration control air jets 21, 22 are positioned at either end of the kiln 20 and air is also fed to a probe support cooling jet 25. After leaving the kiln 30 the hot material is passed to a hydro-reaction mixer 40 where it is mixed with water. The product of the hydro-reaction mixer is then stock piled in a moist condition for curing in ambient air resulting in the detoxified material ready for reuse at the end of the ventilated curing step.

The classified SPL is heated to the required temperature in the rotary kiln 20 and the retention time in the material can be varied by varying the rotational speed of the kiln. The kiln 20 is usually fired by a fossil fuel burner and fuels could be natural petroleum gas, oil, pulverised coal or similar fuels. Additional air is introduced to the kiln to ensure that there is an oxygen rich environment in the kiln to support the chemical breakdown of cyanide. The temperature in the kiln is closely monitored with a number of thermocouple temperature probes located in the bed of material passing through the kiln 20. The temperature probes are mounted on a stainless steel tube through which air is blown from a compressed air source. Blowing air through the tube serves three purposes, namely (a) keeping the tube cool so that its structural integrity is maintained in the hot kiln environment, (b) keeping the signal cables from the thermocouple temperature probes cool in the otherwise hot environment in the kiln, and (c) introducing oxygen near the bed at points along the length of the kiln.

Some classified SPL materials have a tendency to agglomerate in the rotary kiln. This can occur at the feed end 13 when slightly damp material may build up and at points along the kiln where rings form as a result of heat causing certain minerals to enter a liquid phase. Agglomeration is prevented by the agglomeration control jets 21, 22 which direct air from a compressed air source to points where agglomeration may occur. At the feed end 13 the jet of compressed air blows any material that sticks to the kiln lining off the kiln lining.

At points along the kiln where mineral in a liquid phase sticks to the kiln lining starting the formation of undesirable rings compressed air from an agglomeration control jet cools any liquid material returning it to a solid phase. The air jet 25 also cools the refractory lining at that location stopping the formation of liquid material against the hot refractory. The agglomeration control jets 21, 22 provide additional free oxygen in the kiln to support the breakdown of cyanide.

The agglomeration control jets 21, 22 are mounted on a stainless steel pipe inside the kiln 20. The compressed air flowing through the pipe cools the pipe thus maintaining its structural integrity in the same manner as for the tube upon which the kiln temperature probes are mounted.

The reactive compounds that come out of the kiln are neutralised in two stages. In the first stage, known as the hydro-reaction stage, the hot 300° C. to 500° C. SPL material is mixed with water 5° C. to 20° C. The hot material from the kiln drops into a screw mixer. Water is sprayed into the mixer. The water reacts with the hot material from the kiln giving off steam and reaction gases such as acetylene, ammonia, hydrogen and methane. The thermal shock resulting from the hot solid mineral material coming into contact with the water, which is at a much lower temperature, causes surface fracturing of the mineral material. The surface fracturing increases the surface area of the mineral particles for the reaction with water, thus enhancing the process. This is the hydro-reaction process.

The reaction gases are passed through a flame to ensure that flammable gases are destroyed and to use the calorific value of those gases to assist in heating the classified SPL. Most of the reactive gases are given off in this first stage. Samples of the product from this stage are tested for cyanide and reactive compounds.

The second stage of neutralisation is ventilated curing and occurs over a period of up to four weeks. Ventilated curing involves mixing the product from the first neutralisation stage of ambient temperature with water 5° C. to 20° C. in a well ventilated area. A stockpile of material is mixed with water in a well ventilated area using a front end loader. The stockpile is then left to cure in the well ventilated area. During this time a small amount of reactive gases are given off. The loader mixing process typically involves ten minutes of loader mixing for a 50 tonne stockpile of material. The mixing loader mixing takes place on a daily cycle for five to six days of each calendar week. Progressive samples are taken and tested for reactive compounds.

Environmental control of the plant is achieved by passing the process gas through the baghouse dust filter 30. The hot gases from the heating and hydro-reaction processes are mixed with atmospheric air to cool the process gas to the range of between 100 to 120° C. The cooled gas is then passed through a baghouse filter 30 to remove mineral dust from the exhaust gas. The mineral dust is returned to the process plant.

The cured residue that comes from the process described above can then be blended with a number of other materials to produce products that can be sold back to industry particularly for use as a fluxing agent in high temperature processes.

Aluminium smelter by-products are a primary source of raw material for manufacturing a range of industrial mineral and fuel products. The smelter raw materials are supplemented with a relatively small quantity of other raw materials sources externally from the smelter. The smelter mineral by-products are treated with sizing, classification and detoxification processes. Industrial mineral and fuel products are then made by blending the treated smelter materials with the other externally sourced minerals and chemicals to achieve required product specifications.

The aluminium smelter by-products are:

Spent potliner (SPL)—
  Carbon SPL is the carbon cathode lining removed from reduction pots.
  Refractory SPL is the refractory lining of the pots that protects the cathode carbon lining.

Anode butt carbon—the carbon material cleaned from used anodes (anode butts).

Waste carbon—petroleum coke and other waste carbon from floor sweepings, dust filters and other areas of the aluminium smelter that capture waste carbon.

Bake furnace refractory—the refractory material lining material from the furnaces used to bake carbon anodes.

Waste alumina—alumina that has become contaminated with foreign material such that it is not able to be used as a raw material in the aluminium smelting process.

Aluminium dross fines—dross material recovered from the aluminium casting process that has high contents of alumina, sodium and fluorides.

Externally sourced raw materials are:

Black coal—for supplementary carbon.

Brown coal—for supplementary carbon.

Sand—for supplementary silica.

By careful blending and control of the consistencies three useful products have been produced that are sold under the trade marks Hi Cal 50, Hi Cal 60 and ReAl 14.

Technical details of each product are listed hereunder:

Product Hi Cal 50

Carbon fuel with high calorific value. Suitable for use in kilns, boilers, furnaces and rotary dryers. The presence of fluorides and sodium may result in a beneficial mineralization or fluxing effect that reduces firing temperature in manufacture of products such as cement and bricks.

Chemical Analysis

| | | | |
|---|---|---|---|
| Aluminum as $Al_2O_3$ | 12 to 15% | } | |
| Calcium as CaO | 1 to 3% | | |
| Iron as $Fe_2O_3$ | 3 to 6% | | |
| Sodium as $Na_2O$ | 8 to 12% | | X-ray Fluorescence |
| Potassium as $K_2O$ | 0.3 to 0.6% | | |
| Silicon as $SiO_2$ | 8 to 12% | | |
| Sulphur as $SO_3$ | 0.5 to 1.0% | | |
| Carbon (total) | 50 to 55% | | |
| Fluoride (total) | 8 to 12% | | Pyrohydrolysis/Ion Chromatography |
| Fluoride (Leachable) | <2500 mg/l | | Water Soluble Anions/Ion Chromatography |

Trace Element Analysis

| | | | | |
|---|---|---|---|---|
| Mercury | Hg | <0.03 mg/kg | } | Coal Vapour Atomic Absorption Spectrometry |
| Arsenic | As | <15 mg/kg | } | Eschka Fusion Method/Hydride |
| Selenium | Se | <2 mg/kg | } | Inductive Coupled Plasma Spectrometry |
| Antimony | Sb | <3 mg/kg | | |
| Manganese | Mn | <250 mg/kg | } | |
| Nickel | Ni | <100 mg/kg | | |
| Chromium | Cr | <70 mg/kg | | Slow Ash Fusion/ Inductive Coupled Plasma Spectrometry or Atomic Absorption Spectrometry |
| Copper | Cu | <315 mg/kg | | |
| Vanadium | V | <80 mg/kg | | |
| Cobalt | Co | <30 mg/kg | | |
| Beryllium | Be | <10 mg/kg | | |
| Tin | Sn | <30 mg/kg | | |
| Lead | Pb | <80 mg/kg | | |
| Cadmium | Cd | <2 mg/kg | | Graphite Atomic Absorption Spectrometry |
| Chlorine | Cl | <0.01% | | Pyrohydrolysis/Ion Chromatography |
| Cyanide | Cn | <100 mg/kg | | Iron selective Electrode (ISE) |
| Cyanide (Leachable) | Cn | <0.2 mg/l | | Iron selective Electrode (ISE) |

Product Hi Cal 60

Carbon fuel with high calorific value. Suitable for use in kilns, boilers, furnaces and rotary dryers. The presence of fluorides and sodium may result in a beneficial mineralization or fluxing effect that reduces firing temperature in manufacture of products such as cement and bricks.

Chemical Analysis

| | | | |
|---|---|---|---|
| Aluminum as $Al_2O_3$ | 4 to 8% | } | |
| Calcium as CaO | 1 to 3% | | |
| Iron as $Fe_2O_3$ | 1 to 3% | | |
| Sodium as $Na_2O$ | 5 to 8% | | X-ray Fluorescence |
| Potassium as $K_2O$ | 0.2 to 0.4% | | |
| Silicon as $SiO_2$ | 1 to 3% | | |
| Sulphur as $SO_3$ | 0.5 to 1.0% | | |
| Carbon (total) | 60 to 65% | | |
| Fluoride (total) | 4 to 8% | | Pyrohydrolysis/Ion Chromatography |
| Fluoride (Leachable) | <1000 mg/l | | Water Soluble Anions/Ion Chromatography |

Trace Element Analysis

| Mercury | Hg | <0.03 mg/kg | Coal Vapour Atomic Absorption Spectrometry |
|---|---|---|---|
| Arsenic | As | <15 mg/kg | Eschka Fusion Method/Hydride |
| Selenium | Se | <2 mg/kg | Inductive Coupled Plasma Spectrometry |
| Antimony | Sb | <3 mg/kg | |
| Manganese | Mn | <250 mg/kg | |
| Nickel | Ni | <100 mg/kg | |
| Chromium | Cr | <70 mg/kg | Slow Ash Fusion/ Inductive Coupled Plasma Spectrometry or Atomic Absorption Spectrometry |
| Copper | Cu | <315 mg/kg | |
| Vanadium | V | <80 mg/kg | |
| Cobalt | Co | <30 mg/kg | |
| Beryllium | Be | <10 mg/kg | |
| Tin | Sn | <30 mg/kg | |
| Lead | Pb | <80 mg/kg | |
| Cadmium | Cd | <15 mg/kg | Graphite Atomic Absorption Spectrometry |
| Sulphur | S | <8% | Pyrohydrolysis/Titration |
| Chloride | Cl | <0.01% | Pyrohydrolysis/Ion Chromatography |
| Cyanide | Cn | <60 mg/kg | Iron selective Electrode (ISE) |
| Cyanide (Leachable) | Cn | <0.2 mg/l | Iron selective Electrode (ISE) |

Product ReAl 14

Mineral additive with high alumina and silica value. Suitable for use in the manufacture of cement, refractory and bricks. The presence of fluorides and sodium may result in a beneficial mineralization or fluxing effect that reduces firing temperature in manufacture of products such as cement and bricks.

Chemical Analysis

| Aluminum as $Al_2O_3$ | 14 to 18% | |
|---|---|---|
| Calcium as CaO | 2 to 4% | |
| Iron as $Fe_2O_3$ | 3 to 5% | |
| Sodium as $Na_2O$ | 18 to 22% | X-ray Fluorescence |
| Potassium as $K_2O$ | 1 to 2% | |
| Silicon as $SiO_2$ | 35 to 38% | |
| Sulphur as $SO_3$ | 0.5 to 1.0% | |
| Fluoride (total) | 8 to 12% | Pyrohydrolysis/ Ion Chromatography |
| Fluoride (Leachable) | <2200 mg/l | Water Soluble Anions/Ion Chromatography |

Trace Element Analysis

| Mercury | Hg | <0.03 mg/kg | Coal Vapour Atomic Absorption Spectrometry |
|---|---|---|---|
| Arsenic | As | <10 mg/kg | Eschka Fusion Method/Hydride |
| Selenium | Se | <1 mg/kg | Inductive Coupled Plasma |
| Antimony | Sb | <2 mg/kg | Spectrometry |
| Manganese | Mn | <450 mg/kg | |
| Nickel | Ni | <50 mg/kg | |
| Chromium | Cr | <70 mg/kg | Slow Ash Fusion/ Inductive Coupled Plasma Spectrometry or Atomic Absorption Spectrometry |
| Copper | Cu | <50 mg/kg | |
| Vanadium | V | <90 mg/kg | |
| Cobalt | Co | <50 mg/kg | |
| Beryllium | Be | <8 mg/kg | |
| Tin | Sn | <5 mg/kg | |
| Lead | Pb | <50 mg/kg | |
| Cadmium | Cd | <15 mg/kg | Graphite Atomic Absorption Spectrometry |
| Chloride | Cl | <0.01% | Pyrohydrolysis/Ion Chromatography |
| Cyanide | Cn | <60 mg/kg | Iron selective Electrode (ISE) |
| Cyanide (Leachable) | Cn | <0.2 mg/l | Iron selective Electrode (ISE) |

The invention claimed is:

1. A method of treating a spent potliner after use in an aluminum smelting process for the production of non-toxic mineral products, the method comprising crushing and classifying the spent potliner, placing the classified and crushed spent potliner in a furnace, adding no more than air to the furnace, heating the spent potliner in the furnace to a temperature greater than 450° C. to oxidize the spent potliner and less than a temperature at which fluorides enter the gaseous phase to minimize fluoride volitization, mixing the hot product from the furnace with water at a substantially lower temperature to produce reaction gases and residue, destroying flammable gases in the reaction gases by burning, and mixing the residue with water in a well ventilated area for a period of weeks to cure and further detoxify the residue, whereby the non-toxic residue becomes available for the production of non-toxic mineral products.

2. The method according to claim 1 wherein the furnace is a rotary kiln into which air is introduced to ensure an oxygen enriched environment.

3. The method according to claim 2 comprising using thermocouples to control the temperature of the kiln.

4. The method according to claim 2 comprising directing jets of air into the kiln to prevent agglomeration.

5. The method according to claim 1 comprising exposing the wet mixture in a pile to ambient conditions between 5 and 20° C. in a well ventilated location.

6. The method according to claim 5 comprising mixing the pile on a daily basis with total exposure being up to four weeks.

7. The method according to claim 1 further comprising blending the cured residue with other chemicals and minerals to provide useful mineral products.

* * * * *

UNITED STATES PATENT AND TRADEMARK OFFICE
CERTIFICATE OF CORRECTION

PATENT NO. : 7,594,952 B2  Page 1 of 1
APPLICATION NO. : 10/531835
DATED : September 29, 2009
INVENTOR(S) : Cooper et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 624 days.

Signed and Sealed this

Twenty-eighth Day of September, 2010

David J. Kappos
*Director of the United States Patent and Trademark Office*